United States Patent [19]

Waldon et al.

[11] 4,009,417

[45] Feb. 22, 1977

[54] ELECTRICAL APPARATUS WITH HEAT PIPE COOLING

[75] Inventors: Paul L. Waldon; Ronald E. Bennett, both of Hickory, N.C.

[73] Assignee: General Electric Company, New York, N.Y.

[22] Filed: Jan. 27, 1975

[21] Appl. No.: 544,037

[52] U.S. Cl. .................................. 361/38; 165/105; 174/15 R; 336/61

[51] Int. Cl.² .......................................... H02H 7/04

[58] Field of Search ................. 317/15, 14 F, 14 H, 317/100; 310/52, 54, 64; 174/15 R; 336/58, 61; 165/104, 105, 106

[56] References Cited

UNITED STATES PATENTS

| | | | |
|---|---|---|---|
| 854,278 | 5/1907 | Darlington | 165/105 |
| 1,568,727 | 1/1926 | Frank | 336/58 X |
| 2,958,021 | 10/1960 | Cornelison et al. | 165/105 X |
| 3,024,298 | 3/1962 | Goltsos et al. | 336/58 X |
| 3,390,541 | 7/1968 | Johnson et al. | 336/58 X |
| 3,417,814 | 12/1968 | Oktay | 174/15 R X |
| 3,444,419 | 5/1969 | Hansen et al. | 174/15 R X |
| 3,489,207 | 1/1970 | Miller | 174/15 R X |
| 3,614,693 | 10/1971 | Frey | 310/64 X |
| 3,626,080 | 12/1971 | Pierce | 336/58 X |
| 3,713,060 | 1/1973 | Harlow | 336/58 |
| 3,838,668 | 10/1974 | Hays et al. | 165/105 X |

*Primary Examiner*—J. D. Miller
*Assistant Examiner*—Patrick R. Salce
*Attorney, Agent, or Firm*—Francis X. Doyle

[57] ABSTRACT

An electrical apparatus, such as a distribution transformer, having heat pipe cooling. The transformer is provided with a cover in the form of a heat pipe with an evaporator section extending from the cover into the dielectric fluid of the transformer. The top of the cover forms the condenser section of the heat pipe.

4 Claims, 4 Drawing Figures

ELECTRICAL APPARATUS WITH HEAT PIPE COOLING

BACKGROUND OF THE INVENTION

This invention relates to an electrical apparatus, and more particularly, to an electrical apparatus provided with heat pipe cooling means.

It is well-known to those skilled in the art that electrical apparatus, such as distribution transformers and the like, generate considerable heat during operation. It is also well-known that it is necessary to dissipate this heat to prevent the destruction of the electrical apparatus. Normally, the heat is dissipated by air cooling. For example, by pole or pad mounting of the electrical apparatus. When such apparatus is placed below ground, normally vaults are utilized. Grills are provided over the vaults in order to circulate cooling air into vaults and about the electrical apparatus. In all such instances, the size of the container or enclosure for electrical apparatus must provide sufficient area in contact with the air to provide adequate cooling.

When the electrical apparatus is directly buried in the ground, the cooling depends solely on the conduction of the heat from the enclosure of the electrical apparatus through the surrounding soil and to the atmosphere above. In general, cooling by this means is less efficient, thus, larger tanks or enclosures have been required for buried transformers when compared to the enclosures of electrical apparatus of the same rating cooled by air. For buried transformers, since the heat must be conducted through the soil to the atmosphere, the top of the enclosure is the closest surface to the soil-atmosphere interface and thus would be the most efficient heat transfer surface. However, the air space within the transformer enclosure greatly restricts the heat transfer from this surface.

Recently, it has been suggested that buried tanks should be substantially elongated to provide greater surface area in contact with the ground or soil; where the tank is positioned in a substantially constant moisture area. See U.S. Pat. No. 3,443,157. The elongation of the tank is said to improve movement of the insulating fluid and provide better contact between the moving insulating fluid and the entire outer wall of the tank, thus, improving heat conduction. However, the elongated transformer tank depends entirely on the heat conduction between the tank wall and the ground. Thus, the cooling of such device will be dependent on the total surface area of the tank which is in contact with the ground.

It has recently been discovered that more efficient cooling of electrical apparatus can be obtained through the use of heat pipes. Using the heat pipe particularly as a portion of the enclosure of the electrical apparatus will provide greater cooling while not being as dependent on the overall surface area of the electrical apparatus enclosure.

It is therefore, a principle object of this invention to provide an electrical apparatus utilizing heat pipe cooling.

A further object of this invention is to provide an electrical apparatus where the heat pipe used for cooling is part of the apparatus enclosure.

A still further object of this invention is to provide a buried transformer where the cooling of such transformer is provided by a heat pipe formed as part of the transformer.

SUMMARY OF THE INVENTION

In carrying out this invention in one form an electrical apparatus is provided which includes an enclosure having a fluid dielectric therein. A portion of the enclosure is formed as a heat pipe. The evaporator portion of the heat pipe is in contact with the fluid dielectric of the apparatus. The condenser section of the heat pipe forms a part of the exterior surface of the enclosure. In an embodiment of the invention, the condenser portion may be provided with fins.

The invention which is sought to be protected will be particularly pointed out and distinctly claimed in the claims appended hereto. However, it is believed that this invention, and the manner in which its various objects and advantages are obtained, as well as other objects and advantages thereof, will be better understood by reference to the following detailed description of the preferred embodiment, particularly when considered with the accompanying drawings.

DESCRIPTION OF PREFERRED EMBODIMENT

The invention relates to an electrical apparatus and particularly, to an electrical apparatus wherein a heat pipe is used for cooling of the apparatus. More particularly, the invention is concerned with electrical apparatus wherein the heat pipe forms a part of the enclosure of the electrical apparatus.

Heat pipes are well-known to those skilled in the cooling art and have been extensively described in the literature. Generally, the heat pipe is in the form of a hollow geometric enclosure having a wick and a working fluid. Typically, one portion of the heat pipe is the evaporator section wherein heat acts on the working fluid to evaporate such fluid. Another section of the heat pipe is the condenser section and the evaporated working fluid flows to the condenser section where it condenses to a liquid. Normally, the liquid returns through the wick to the evaporator portion of the heat pipe. An excellent description of heat pipes and various designs used in cooling electronic devices may be found in Electronics of Dec. 12, 1974, pages 114–117. Insofar as necessary to further describe the function of a heat pipe, such description is included by reference herein. In some uses of heat pipes, it has been found that a wick as such is unnecessary. Where the heat pipe is in a substantially vertical position with the evaporator section at the lower end and the condenser section at the upper end; wicking is normally not required. This heat pipe in effect becomes a thermal syphon. In these devices, as will be understood, the working fluid becomes vaporized at the evaporator end and condenses back to a liquid at the condenser end. The condensed liquid flows by gravity back to the evaporator end.

In the preferred embodiment of this invention, the upper portion or cover of the electrical apparatus enclosure is in the form of a heat pipe. Using the cover portion of the enclosure as the heat pipe, it is not necessary to provide a wick structure within the heat pipe.

Figure 1:
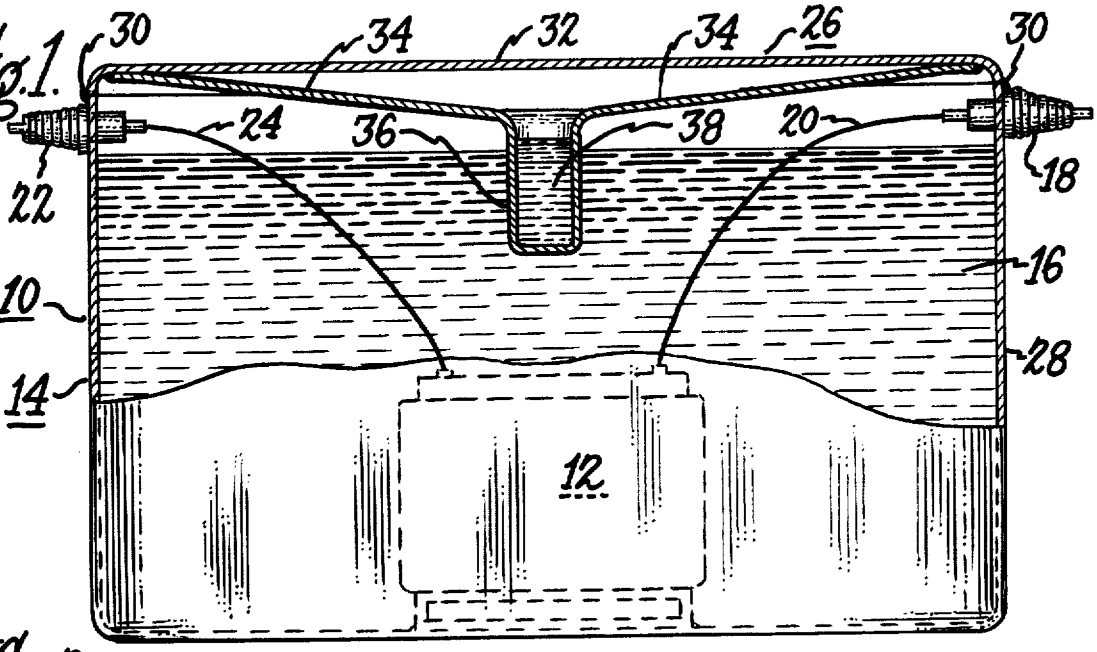
FIG. 1 is an elevational view partly in section, of one form of construction of an electrical apparatus including the preferred embodiment of this invention.

Referring now to the drawings therein like numerals are used to indicate like parts, FIG. 1 shows one form of an electrical apparatus utilizing the preferred embodiment of this invention. As is shown in FIG. 1, an electrical apparatus 10 is in the form of a transformer having a core and coil unit 12 mounted within an enclosure 14. The core and coil unit 12 is immersed in a liquid dielectric 16 such as, for example, mineral oil. As shown in FIG. 1, a bushing 18 provides the lead-in for a high voltage lead 20 to core and coil unit 12. In a similar manner, bushing 22 is shown providing for the exit from the apparatus 10 of the low voltage lead 24. As above described, apparatus 10 of FIG. 1 is a conventional distribution transformer.

As is shown in FIG. 1, the cover 26 of the apparatus 10 is welded or otherwise secured to wall 28 as is indicated at 30. As will be apparent, wall 28 and cover 26 form enclosure 14. As can be seen from FIG. 1, the cover 26 is a hollow member forming a heat pipe. Cover 26 has an upper flat wall 32 with tapered lower walls 34 leading to a depending portion 36 which extends into the dielectric 16. As will be understood, the depending portion 36 forms the evaporator section of the heat pipe cover 26. Portion 36 is shown as containing a working fluid 38 which may be, for example, water. As will be understood from the previous discussion, as the electrical apparatus 10 operates, the dielectric liquid 16 becomes heated. The heat from dielectric liquid 16 will operate on the evaporator section 36 causing the evaporation of the working fluid 38. As working fluid 38 vaporizes it raises in the hollow cover 26 and reaches wall 32 which is the condenser section of heat pipe cover 26. The working fluid will condense on wall 32 and return to evaporator section 36 through the tapered walls 34. The evaporation of working fluid 38 will aid in removing the heat from dielectric 16 and, thus, provide cooling of apparatus 10.

Figure 2:
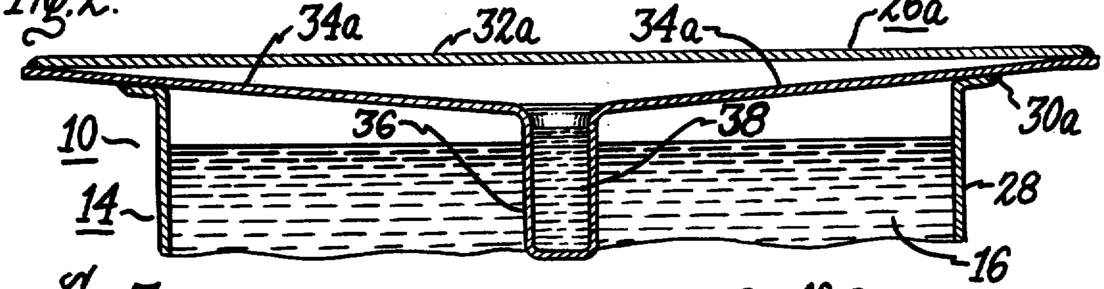
FIG. 2 is a partially sectional view, similar to FIG. 1 showing a modification of the embodiment of FIG. 1.

FIG. 2 shows one modification of the invention in which a cover 26*a* is provided on enclosure 14 of electrical apparatus 10. As shown in FIG. 2, cover 26*a* is connected to wall 28 of enclosure 14 such as, for example, by welding 30*a*. As can be seen in this modification, cover 26*a* is substantially larger than the side walls 28 of enclosure 14, thus, providing a much larger condenser area 32*a*. As in FIG. 1, the tapered lower walls 34*a* lead to the evaporator section 36 which is provided with the working fluid 38. Also in the same manner as FIG. 1, evaporator section 36 is immersed in the dielectric 16. The operation of the modification of FIG. 2 will be the same as previously described for FIG. 1. However, with the enlarged condenser section 32*a* greater cooling can be provided to the electrical apparatus 10.

Figure 3:
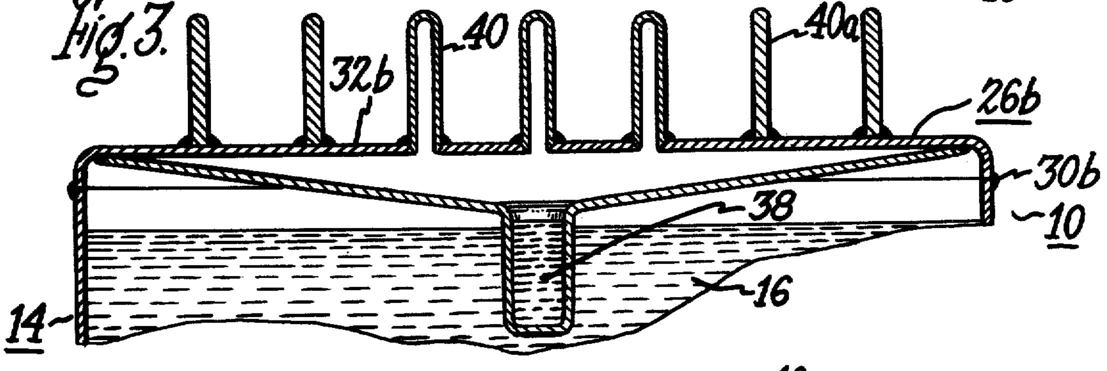
FIG. 3 is a partially sectional view, similar to FIG. 1 showing another modification of the embodiment of FIG. 1.

FIG. 3 shows a further modification in that cover 26*b* is provided with a plurality of fins 40 which extend from upper wall 32*b* of the heat pipe cover 26*b*. FIG. 3 shows hollow fins 40 and solid fins 40*a*. As will be understood, either type of fin could be used or the fins could be mixed as shown in FIG. 3. It will be understood that with hollow fins 40, the working fluid 38 after it is vaporized would raise into the hollow fins 40 and condense on the walls thereof. Thus, in the modification shown in FIG. 3, the condenser section 32*b* has its area extended by means of the hollow fins 40. This will also enable greater cooling of the electrical apparatus 10 as compared to the heat pipe 26 of FIG. 1.

Figure 4:
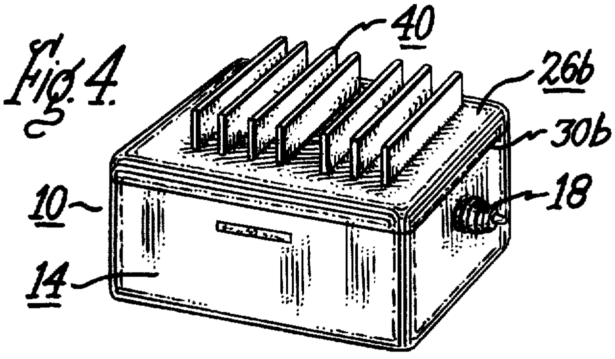
FIG. 4 is a perspective view on a much smaller scale, showing one form of an electrical apparatus utilizing the modification of FIG. 3 of this invention.

FIG. 4 shows one embodiment of an electrical apparatus 10 utilizing the form of invention shown in FIG. 3. As can be seen in FIG. 4, the enclosure 14 is substantially a rectangular tank having the cover 26*b* secured thereto along the line 30*b* which may be, for example, a weldment. Fins 40 are shown in FIG. 4 secured to cover 26*b* and as previously noted may be either hollow as at 40 in FIG. 3 or solid as at 40*a* in FIG. 3.

As will be apparent from the above description, by making the cover of the enclosure in the form of a heat pipe, the cover is a very efficient heat transfer surface. When buried, the cover would greatly aid in cooling the electrical device. Of course, the heat pipe portion of the enclosure would aid cooling, whether in air or underground.

While there has been shown and described the present preferred embodiment of this invention, it will, of course, be understood that various modifications may be made. Obviously, the enclosure may be of any desired geometrical shape and where desired, the bushings may be secured to the heat pipe cover rather than mounted on the side wall. It will be apparent to those skilled in the art that all such modifications as may be made are included herein to the extent they are within the scope of the invention defined by the claims appended hereto.

What is claimed as new and which it is desired to secure by Letters Patent of the United States is:

1. An electrical apparatus including an enclosure with a heat generating unit mounted therein and immersed in a dielectric fluid, a portion of said enclosure being hollow and forming a heat pipe, said hollow portion of said enclosure including an evaporator section which extends into said fluid dielectric and a condenser section forming an exterior wall of said enclosure, said hollow portion containing a working fluid.

2. An electrical apparatus as claimed in claim 1, in which said hollow portion forms the cover of said enclosure.

3. An electrical apparatus as set forth in claim 2, in which said cover extends substantially beyond the side walls of said enclosure.

4. An electrical apparatus as set forth in claim 2, in which fins are secured to the upper wall of said hollow cover.

* * * * *